United States Patent [19]

Wakasu

[11] Patent Number: 5,513,301
[45] Date of Patent: Apr. 30, 1996

[54] IMAGE COMPRESSION AND DECOMPRESSION APPARATUS WITH REDUCED FRAME MEMORY

[75] Inventor: Yutaka Wakasu, Tokyo, Japan

[73] Assignee: NEC Corporation, Japan

[21] Appl. No.: 342,133

[22] Filed: Nov. 18, 1994

[30] Foreign Application Priority Data

Nov. 22, 1993 [JP] Japan .................. 5-291732

[51] Int. Cl.⁶ .................................................. G06F 15/00
[52] U.S. Cl. ................................... 395/114; 358/470
[58] Field of Search ........................ 395/100, 101, 395/106, 114, 164, 114, 164, 425; 358/443, 470, 448

[56] References Cited

U.S. PATENT DOCUMENTS

| | | | |
|---|---|---|---|
| 4,884,147 | 11/1989 | Arimoto et al. | 358/443 |
| 5,175,631 | 12/1992 | Juri et al. | 358/335 |
| 5,329,616 | 7/1994 | Silverbrook | 395/164 |
| 5,343,256 | 8/1994 | Kimura et al. | 348/718 |
| 5,357,614 | 10/1994 | Pattisam et al. | 395/250 |
| 5,363,206 | 11/1994 | Fukushima | 358/440 |
| 5,379,070 | 1/1995 | Retter et al. | 348/403 |
| 5,379,351 | 1/1995 | Fandrianto et al. | 382/41 |
| 5,384,849 | 1/1995 | Jeong | 380/49 |
| 5,394,534 | 2/1995 | Kulakowsi et al. | 395/425 |
| 5,410,352 | 4/1995 | Watanabe | 358/405 |
| 5,410,671 | 4/1995 | Elgamal et al. | 395/425 |

FOREIGN PATENT DOCUMENTS

| | | |
|---|---|---|
| 56-1383377 | 1/1982 | Japan . |
| 61-176253 | 12/1986 | Japan . |
| 61-176264 | 12/1986 | Japan . |
| 62-195987 | 2/1988 | Japan . |

*Primary Examiner*—Mark R. Powell
*Assistant Examiner*—Gabriel I. Garcia
*Attorney, Agent, or Firm*—Laff, Whitesel, Conte & Saret, Ltd.

[57] ABSTRACT

An image compression and decompression apparatus wherein the scale of a required frame memory is reduced to allow reduction of the circuit scale is disclosed. The image compression and decompression apparatus comprises first and second frame memories each of which is used as, upon compression processing, a pre-frame memory for storing digital image data before compression but as, upon decompression processing, a post-frame memory for storing digital image data after decompression. First and second compressed image memories are each used as, upon compression processing, a transmission buffer for storing data after compression but as, upon decompression processing, a reception buffer for storing data before decompression. Each of the two kinds of memories is constructed in a double buffer structure. Control of two kinds of memory controllers for controlling accessing to the two kinds of memories, compression and decompression processing, and sequence control are effected using a program.

1 Claim, 9 Drawing Sheets

IMAGE COMPRESSION AND DECOMPRESSION APPARATUS WITH REDUCED FRAME MEMORY

BACKGROUND OF THE INVENTION

1. Field of the Invention

This invention relates to an image compression and decompression apparatus which compresses and decompresses an image, and more particularly to an image compression and decompression apparatus which compresses and decompresses an image in a computer system.

2. Description of the Related Art

In recent years, systems wherein video images are digitized to obtain image data and the image data are processed by various processes including transfer or display of data have been and are used in practical use.

However, since a large amount of data are obtained by digitization of video images, various problems are encountered in that much time is required for transfer of data, that a large scale is required for a storage medium or that a storage medium is occupied at a high rate by the data. Accordingly, in an image data processing system for a transfer system or a storage system, it is required to efficiently compress data after digitization to reduce the amount of data to be transferred or stored and decompress the thus compressed data so as to allow reproduction or processing of the data.

One of such systems as described above is disclosed in Japanese Patent Laid-Open Application No. Showa 62-195987. In particular, the prior art document discloses an image coding and decoding apparatus wherein a buffer for data in units of a video frame is interposed between a pre-processing section and a coding section and between the coding section and a video outputting section of a coder and the coding processing rate is decreased in response to a transmission rate while time division processing is employed to achieve reduction of the scale of the apparatus and improvement in coding efficiency. The coding section, that is, an image compression circuit, of the image coding and decoding apparatus disclosed in the prior art document is shown in FIG. 11, and a decoding section, that is, an image decompression section, disclosed in the prior art document is shown in FIG. 12.

Referring first to FIG. 11, the image compression circuit shown includes an analog to digital (A/D) converter 71, a time integration circuit 72, a switch 73, first and second pre-frame memories 74 and 75, a selector 76, a pre-frame memory controller 77, an interframe coding circuit 78, a frame memory 79, a switch 80, first and second transmission buffers 81 and 82, and a selector 83. A pre-frame memory of the double buffer structure is formed from the switch 73, first and second pre-frame memories 74 and 75, and selector 76. Meanwhile, a transmission buffer of the double buffer structure is formed from the switch 80, first and second transmission buffers 81 and 82, and selector 83.

Operation of the components of the image compression circuit will be described below. Each of the first and second pre-frame memories 74 and 75 has a storage capacity for data for at least one image frame. The analog to digital converter 71 digitizes an input video signal and outputs a digital video signal. The time integration circuit 72 integrates the digital video signal with respect to time in units of an image frame. The switch 73 switchably writes the image frame integrated with respect to time by the time integration circuit 72 into the first or second frame memory 74 or 75. The selector 76 reads data from the first or second pre-frame memory 74 or 75 with which writing of data is not proceeding. The pre-frame memory controller 77 controls writing and reading of data into and from the first and second pre-frame memories 74 and 75. The frame memory 79 has a storage capacity for data for at least one image frame. The interframe coding circuit 78 receives a signal read out from the first or second frame memory 74 or 75 as an input signal thereto, locally decodes picture elements which have been decoded already, stores the locally decoded picture elements into the frame memory 79, forms an interframe predictive signal, and performs interframe coding in units of a predetermined amount of picture elements in such a method that the picture elements can be coded and decoded sequentially. The first and second transmission buffers 81 and 82 can store coded information obtained from the interframe coding circuit 78. The switch 80 switchably writes sequentially coded information into the first or second transmission buffer 81 or 82. The selector 83 reads data from the first or second transmission buffer 81 or 82 with which wiring of data is not proceeding. The signal selected by the selector 83 is transmitted as a transmission signal of the image compression circuit.

In this manner, the image compression circuit of FIG. 11 can decrease drops of data in the direction of the time base by the arrangement of the two pre-frame memories 74 and 75 and the two transmission buffers 81 and 82.

Meanwhile, the image decompression circuit shown in FIG. 12 includes a reception buffer 91, an interframe decoding circuit 92, a frame memory 93, a switch 94, first to third post-frame memories 95, 96 and 97, a selector 98, and a digital to analog (D/A) converter 99. A post-frame memory of the triple buffer structure is constructed from the switch 94, first to third post-frame memories 95, 96 and 97, and selector 98.

Subsequently, operation of the image decompression circuit shown in FIG. 12 will be described. The reception buffer 91 can sequentially store and read out a received coded signal (transmission signal). The frame memory 93 has a storage capacity for data for at least one image frame. The interframe decoding circuit 92 receives a signal read out from the reception buffer 91 as an input signal thereto, stores picture elements which have been decoded already into the frame memory 93, forms an interframe predictive signal, and effects sequential interframe decoding in accordance with the coding method which has been employed by the interframe coding circuit 78 shown in FIG. 11. Each of the first to third post-frame memories 95 to 97 has a storage capacity for data for at least one image frame. The switch 94 switchably writes a decoded signal outputted from the interframe decoding circuit 92 into the first, second or third post-frame memory 95, 96 or 97. The selector 98 selectively reads out a decoded image frame stored in the first, second or third post-frame memory 95, 96 or 97, with which writing is not proceeding, in synchronism with a frame synchronizing signal of an image outputting system. The digital to analog converter 99 converts a signal selected by the selector 98 into a decoded video signal.

The image decompression circuit of FIG. 12 can reduce drops of data in the direction of the time base by the arrangement of the three post-frame memories 95 to 97 in this manner.

The image compression and decompression apparatus, however, is disadvantageous in that it is large in scale and high in cost since it includes, as seen from FIGS. 11 and 12, the frame memories 74, 75, 79, 93, 95, 96 and 97 for seven frames.

Several other systems of the type described above are also known including an image processing system disclosed in Japanese Patent Laid-Open Application No. Showa 61-176264, wherein, when an abnormal condition of a decompression operation of decompression means is detected by detection means, a normal decompressed image signal stored in storage means is supplied to output means in place of the decompressed image in which the abnormal condition has been detected so that an image output free from a disorder can be obtained. The image processing system is directed to a countermeasure against an error in decompression. Meanwhile, Japanese Patent Laid-Open Application No. Showa 61-176253 discloses an image processing system which is directed to elimination of a density difference between a compressed binary image and an original image, in the image processing system, the density analysis degrees of image signals from output means and storage means to be supplied to formation means upon image formation are made coincide with each other so that an image can be formed normally in an equal density. Further, Japanese Patent Laid-Open Application No. Showa 56-138377 discloses a video signal multiple carrying system which is directed to a transmission system for an analog video signal. In the video signal multiple carrying system, individual video signals are compressed by time base compression at rates which increase in inverse proportion to frequency bands of them to uniform the video bands of them and then the video signals of the uniform video band are composed by time division composition and transmitted in order to decrease the number of required frequency bands.

SUMMARY OF THE INVENTION

It is an object of the present invention to provide an image compression and decompression apparatus wherein the scale of a required frame memory is reduced to allow reduction of the circuit scale.

In order to attain the object described above, according to the present invention, there is provided an image compression and decompression apparatus, which comprises first and second frame memories each serving as a pre-frame memory for storing digital image data before compression when the image compression and decompression apparatus effects compression processing but as a post-frame memory for storing digital image data after decompression when the image compression and decompression apparatus effects decompression processing, first and second compressed image memories each serving as a transmission buffer for storing data after compression when the image compression and decompression apparatus effects compression processing but as a reception buffer for storing data before decompression when the image compression and decompression apparatus effects decompression processing, an orthogonal transformer for transforming a digital video signal by orthogonal transformation or inverse orthogonal transformation, a video memory controller for controlling accessing to the first and second frame memories, fetching of a video signal and switching between orthogonal transformation and inverse orthogonal transformation of the orthogonal transformer, a memory controller for controlling accessing to the first and second compressed image memories and for interfacing with a host computer, and a processor for effecting control of the video memory controller and the memory controller including delivery of an instruction to perform a compression operation or a decompression operation in accordance with a program.

Preferably, each of the first and second frame memories has a double buffer construction which includes a pair of buffers each having a capacity for data for at least one frame and switchably used in units of a frame or a field, and each of the first and second compressed image memories has a double buffer construction which includes a pair of buffers each having a capacity for data for at least one frame and switchably used in units of a frame or a field.

With the image compression and decompression apparatus, the processing sequence is controlled using the processor so that the component circuits of the image compression and decompression apparatus are used commonly for compression and decompression of an image thereby to reduce the scale of the required frame memories. Consequently, the circuit scale can be reduced. Further, since the processing sequence is controlled using the processor, the image compression and decompression apparatus can cope with various processing sequences and data formats by modifying the program for the processor.

The above and other objects, features and advantages of the present invention will become apparent from the following description and the appended claims, taken in conjunction with the accompanying drawings in which like parts or elements are denoted by like reference characters.

DESCRIPTION OF THE PREFERRED EMBODIMENT

Figure 1:
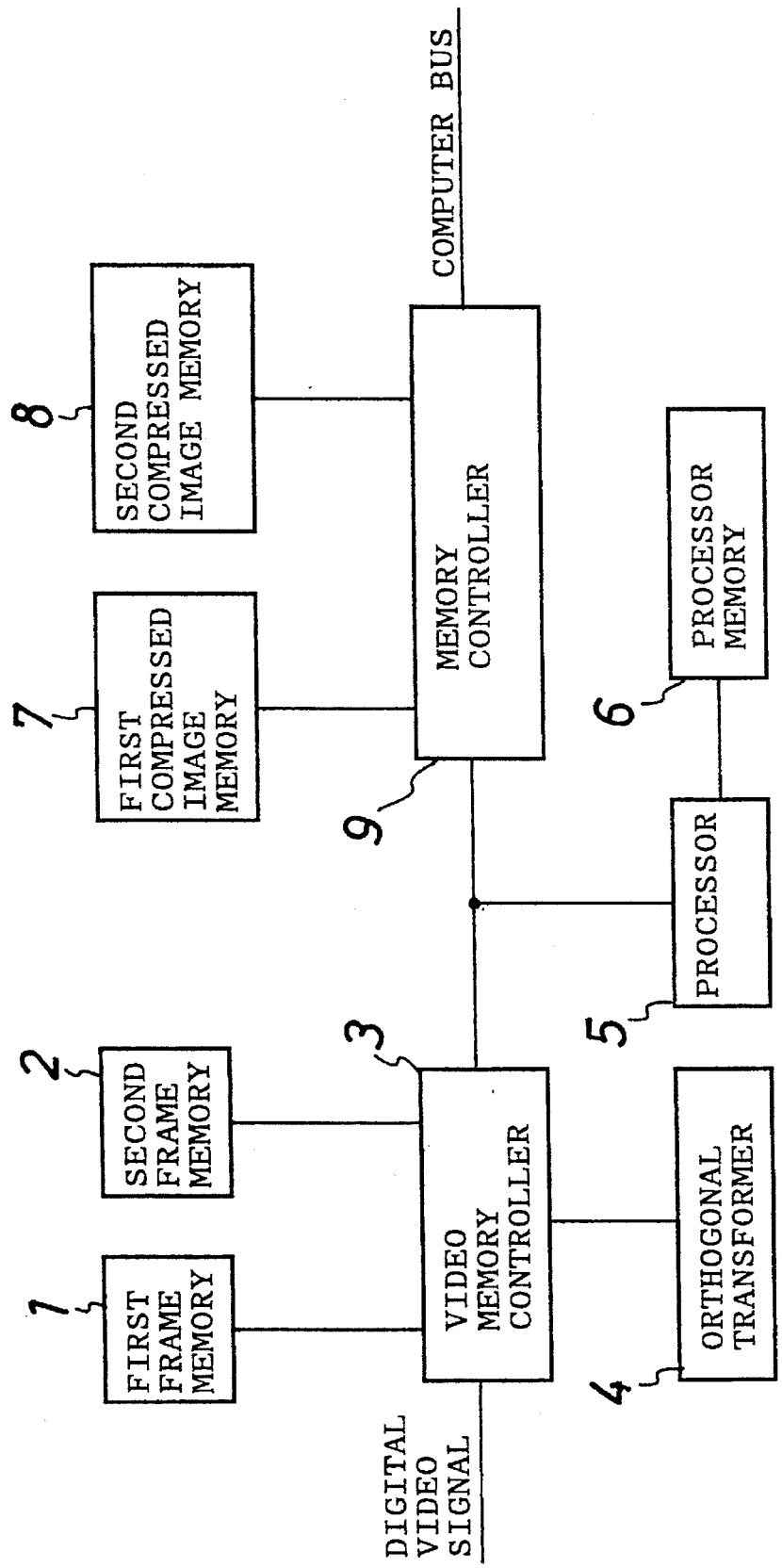
FIG. 1 is a block diagram of an image compression and decompression apparatus showing a preferred embodiment of the present invention.

Referring first to FIG. 1, there is shown an image compression and decompression apparatus according to a preferred embodiment of the present invention. The image compression and decompression apparatus comprises first and second frame memories 1 and 2, a video memory controller 3, an orthogonal transformer 4, a processor 5, a processor memory 6, first and second compressed image memories 7 and 8, and a memory controller 9.

The first frame memory 1 stores image data for one frame. The second frame memory 2 is used switchably with the first frame memory 1 and stores image data for one frame. The video memory controller 3 fetches a digital video signal and controls switching of access between the first frame memory 1 and the second frame memory 2. The orthogonal transformer 4 performs orthogonal transformation of digital image data and inverse orthogonal transformation of compressed image data. The processor 5 effects operation control for compression and decompression operation as hereinafter described. The first compressed image memory 7 temporarily stores a compressed image. The second compressed image memory 8 is used switchably with the first compressed image memory 7. The memory controller 9 effects access control between the first compressed image memory 7 and the second compressed image memory 8 and interfacing with a host computer not shown.

Subsequently, operation of the image compression and decompression apparatus of the present embodiment will be described with reference to FIGS. 2 and 3.

Figure 2:
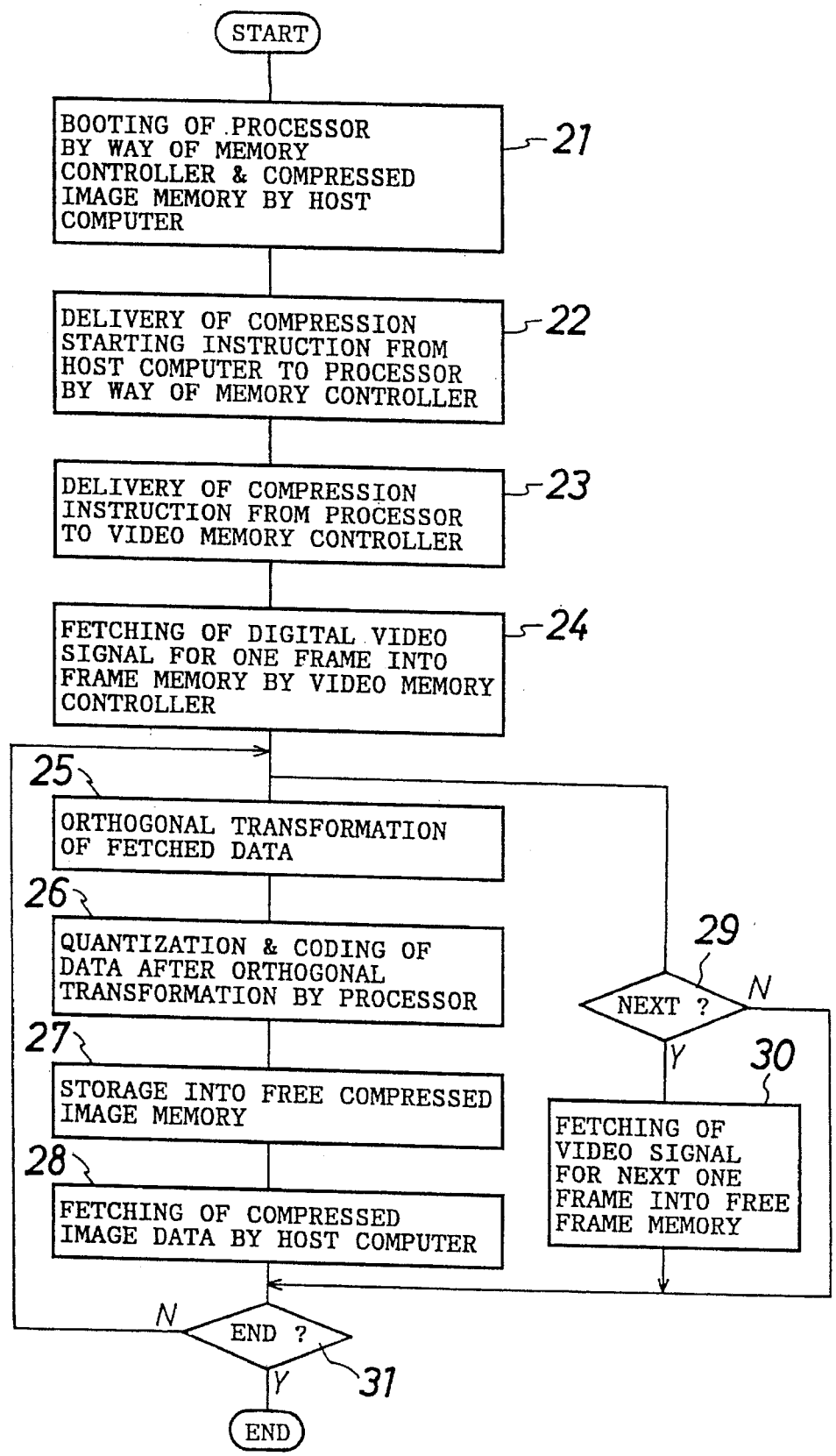
FIG. 2 is a flow chart illustrating operation in compression processing of the image compression and decompression apparatus shown in FIG. 1.

Referring first to FIG. 2, there is shown a flow chart of the compression processing. First, the host computer accesses the first compressed image memory 7 or the second compressed image memory 8 by way of the memory controller 9 and boots the processor 5 by way of the memory controller 9 (step 21). The host computer then delivers a compression starting instruction to the processor 5 by way of the memory controller 9 (step 22). Upon reception of the compression starting instruction, the processor 5 delivers a compression instruction to the video memory controller 3 (step 23). The video memory controller 3 thus stores a digital video signal for one frame into the first frame memory 1 (frame memory A) (step 24).

After the storage of the digital video signal for one frame at step 24 is completed, the video memory controller 3 stores a next frame into one of the first frame memory 1 and the second frame memory 2 which is free and is not being used (step 30) until an instruction to end the compression is received from the processor 5 (step 29). While digital image data for the next frame are being fetched (step 30), the video memory controller 3 reads out the formerly fetched image data from the corresponding frame memory 1 or 2 and sends the image data to the orthogonal transformer 4 so that orthogonal transformation is performed by the orthogonal transformer 4 (step 25). The data after the orthogonal transformation are fetched, quantized and coded by the processor 5 (step 26), and the resulted data are stored into a free one of the first compressed image memory 7 and the second compressed image memory 8 by way of the memory controller 9 (step 27). The compressed image data stored in the first compressed image memory 7 or the second compressed image memory 8 are fetched by the host computer (step 28). The processes at steps 25 to 30 are repeated by a required number of times switching between the first frame memory 1 (frame memory A) and the second frame memory 2 (frame memory B) and switching between the first compressed image memory 7 and the second compressed image memory 8 (step 31).

Figure 4:
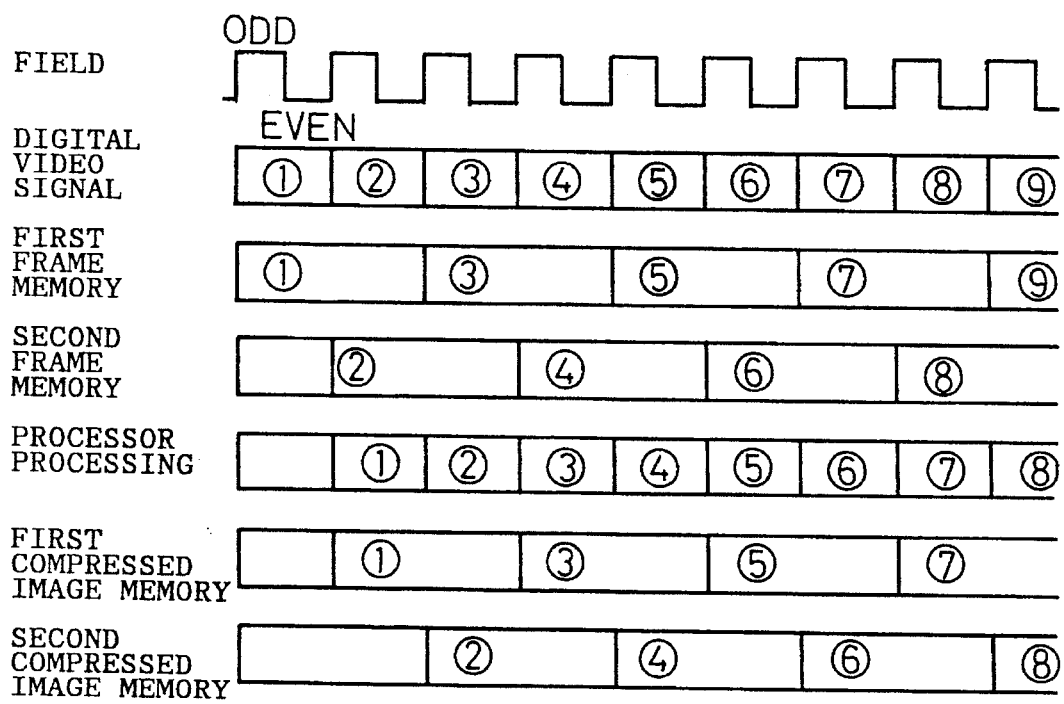
FIG. 4 is a time chart illustrating a flow of data at 30 frames/second upon compression.
Figure 5:
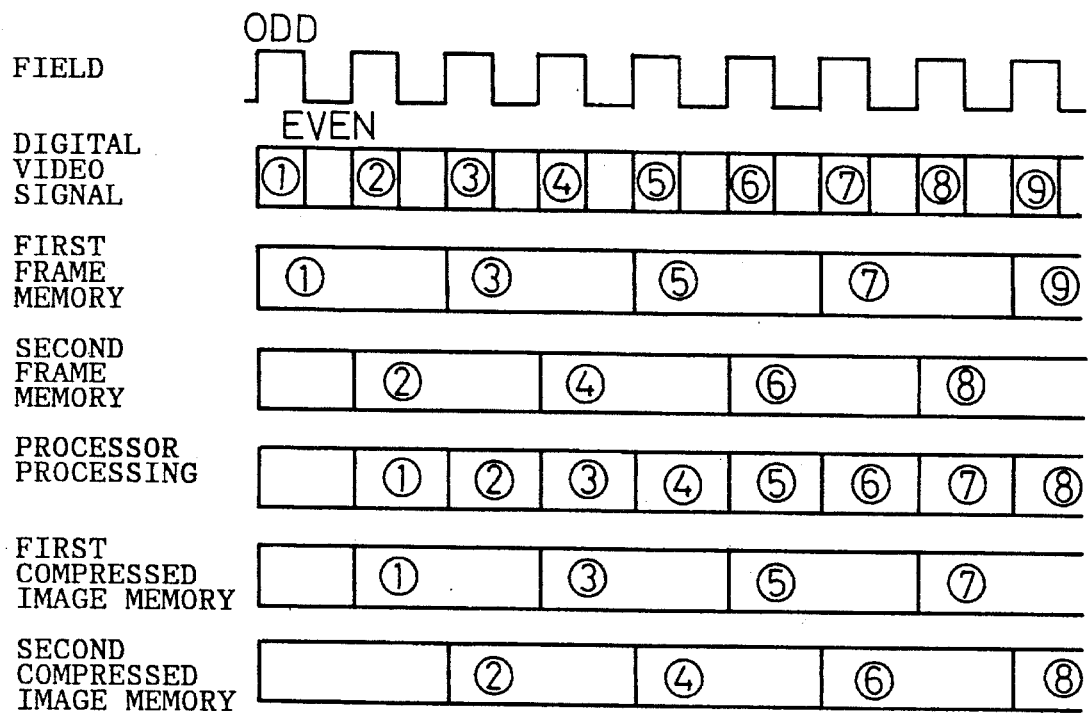
FIG. 5 is a time chart illustrating a flow of data at 30 fields/second upon compression.
Figure 6:
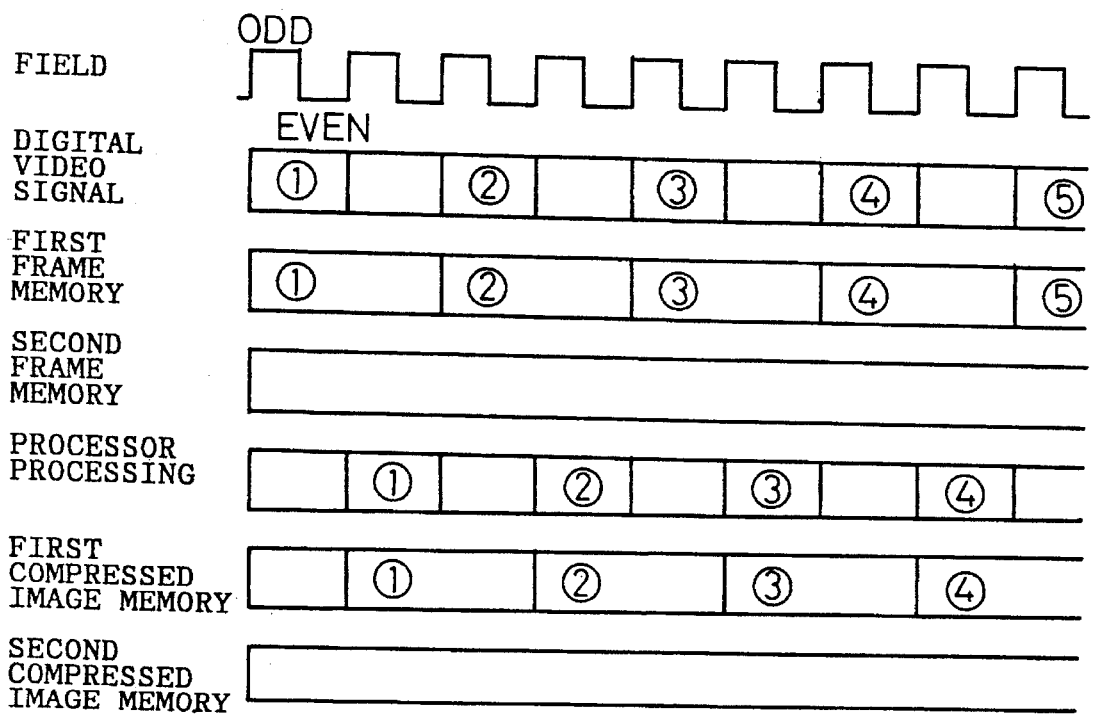
FIG. 6 is a time chart illustrating a flow of data at 15 frames/second upon compression.

FIGS. 4, 5 and 6 schematically illustrate transition conditions of data upon compression processing, and in FIGS. 4, 5 and 6, the axis of abscissa indicates time and each numeral surrounded by a circle represents a frame number or a field number of an odd-numbered field. FIG. 4 illustrates a flow of data at 30 frames/second; FIG. 5 illustrates a flow of data at 30 fields/second; and FIG. 6 illustrates a flow of data at 15 frames/second.

Figure 3:
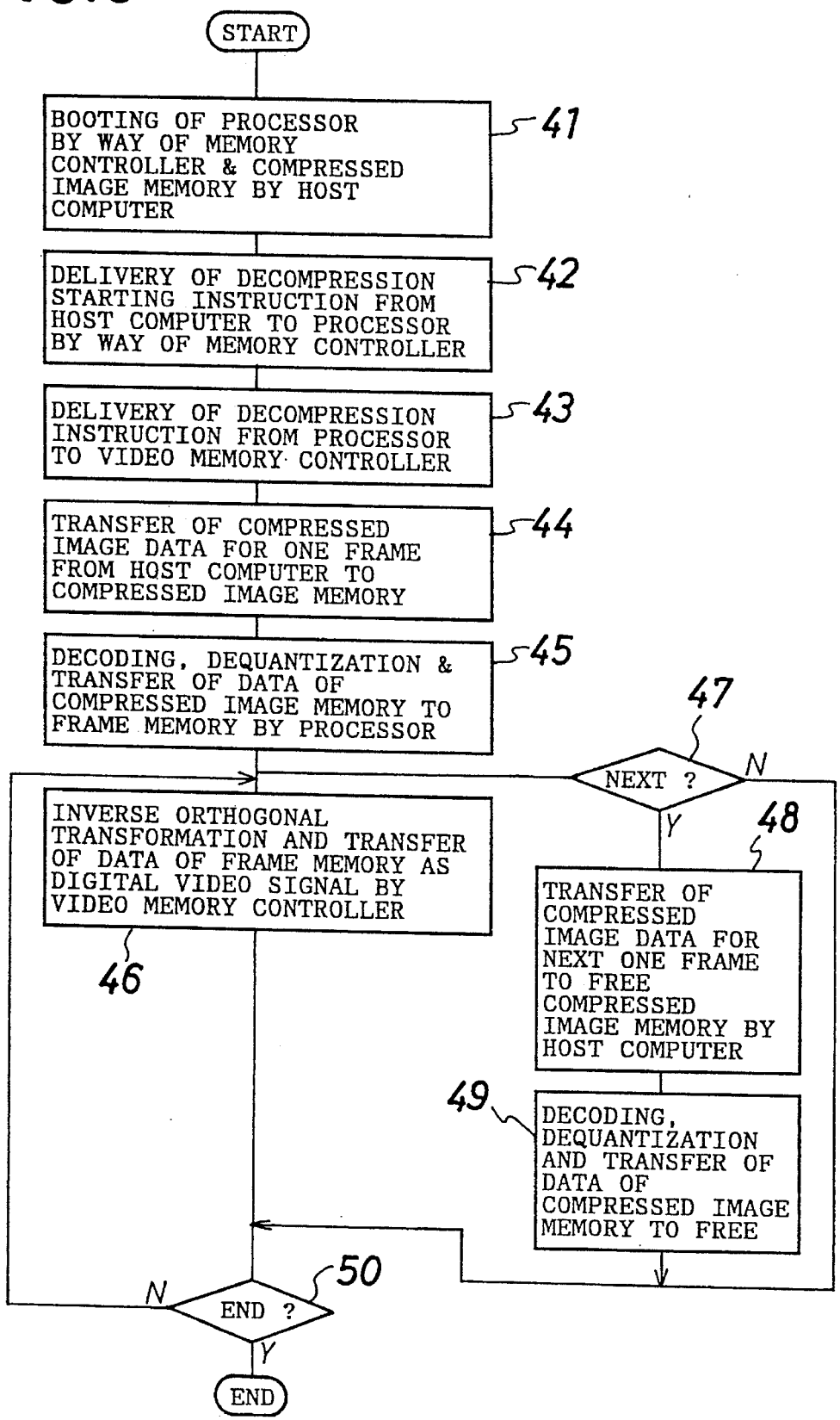
FIG. 3 is a flow chart illustrating operation in decompression processing of the image compression and decompression apparatus shown in FIG. 1.

Referring now to FIG. 3, there is shown a flow chart of the decompression processing. First, the host computer accesses the first compressed image memory 7 or the second compressed image memory 8 by way of the memory controller 9 and boots the processor 5 by way of the memory controller 9 (step 41). Then, the host computer delivers a decompression starting instruction to the processor 5 by way of the memory controller 9 (step 42). Upon reception of the decompression starting instruction, the processor 5 delivers a decompression instruction to the video memory controller 3 (step 43). The host computer then transfers compressed image data for one frame to the first compressed image memory 7 by way of the memory controller 9 (step 44). The processor 5 then fetches the compressed image data stored in the first compressed image memory 7 by way of the memory controller 9, effects decoding and dequantization of the compressed image data and then transfers the resulted data to the first frame memory 1 (frame memory A) (step 45).

After the data for one frame are stored into the frame memory (first frame memory 1) (step 45), the video memory controller 3 fetches the data stored in the current frame memory (first frame memory 1), controls the orthogonal transformer 4 to effect inverse orthogonal transformation of the data and outputs the resulted data as a digital video signal (step 46). While the video memory controller 3 effects the process at step 46, if necessary (step 47), the host computer transfers compressed image data of a next frame into a free one of the compression image memories 7 and 8 by way of the memory controller 9 (step 48). The processor 5 fetches, decodes and dequantizes the thus transferred data and stores the resulted data into a free one of the frame memories 1 and 2 by way of the video memory controller 3 (step 49). The processes at steps 47 to 49 are repeated by a required number of times switching between the first frame memory 1 and the second frame memory 2 and switching between the first compressed image memory 7 and the second compressed image memory 8 (step 50).

Figure 7:
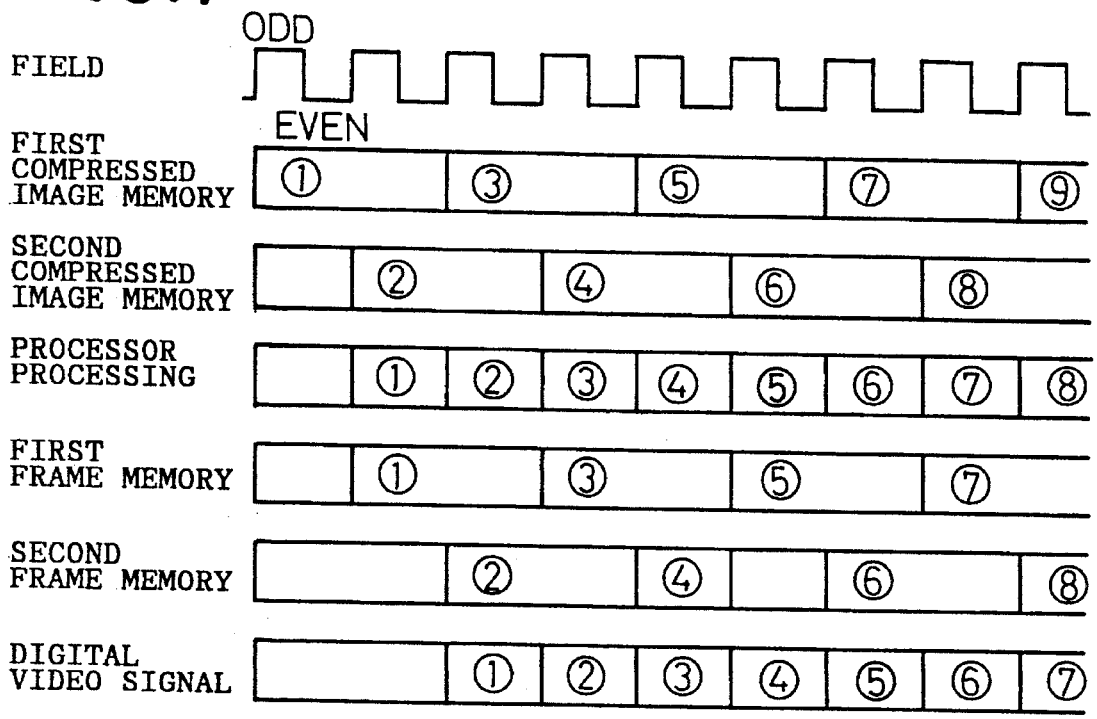
FIG. 7 is a time chart illustrating a flow of data at 30 frames/second upon decompression.
Figure 8:
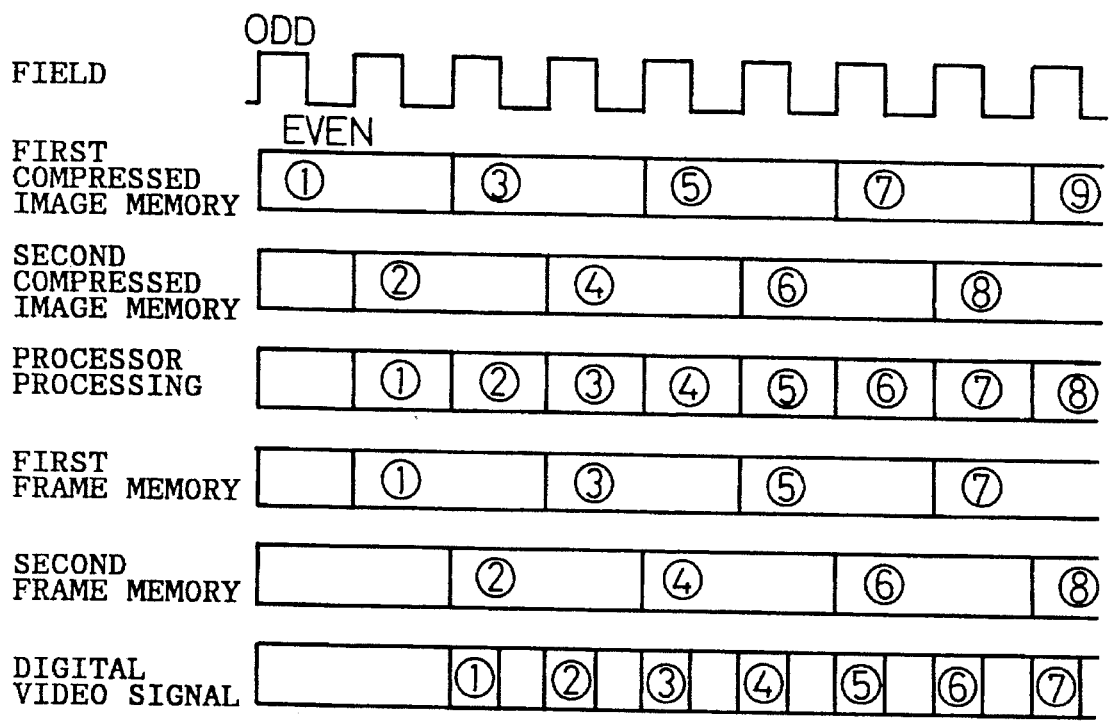
FIG. 8 is a time chart illustrating a flow of data at 30 fields/second upon compression.
Figure 9:
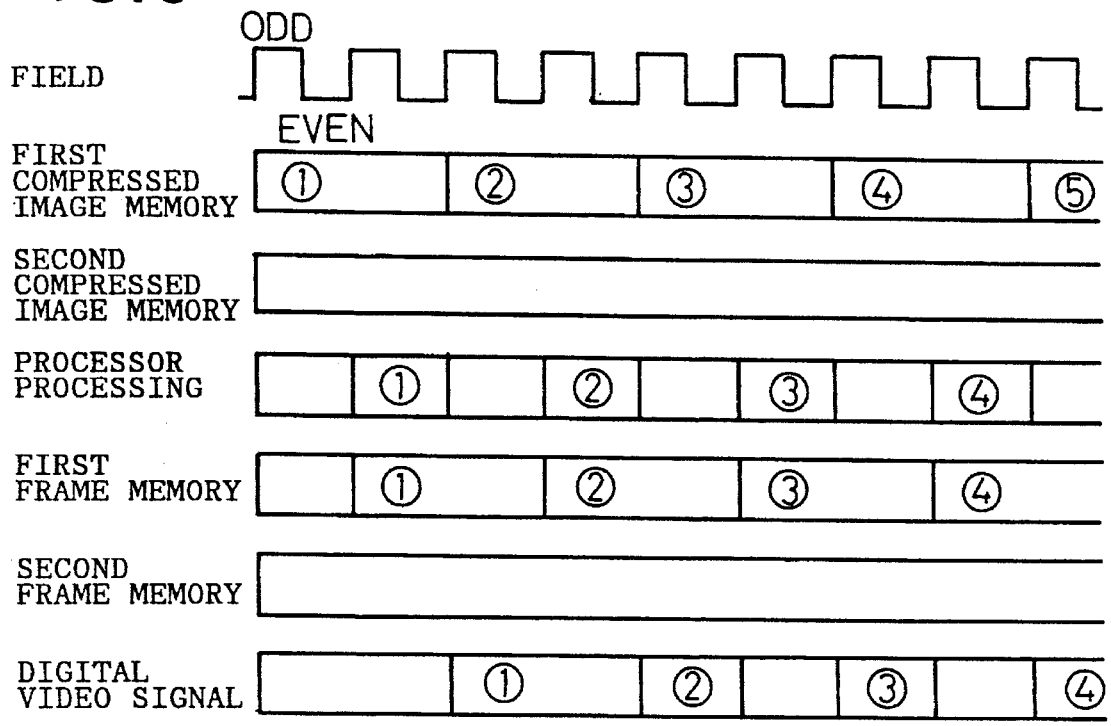
FIG. 9 is a time chart illustrating a flow of data at 15 frames/second upon compression.

FIGS. 7, 8 and 9 schematically illustrate transition conditions of data upon decompression processing, and in FIGS. 7, 8 and 9, the axis of abscissa indicates time and each numeral surrounded by a circle represents a frame number or a field number of an odd-numbered field. FIG. 7 illustrates a flow of data at 30 frames/second; FIG. 8 illustrates a flow of data at 30 fields/second; and FIG. 9 illustrates a flow of data at 15 frames/second.

Figure 10:
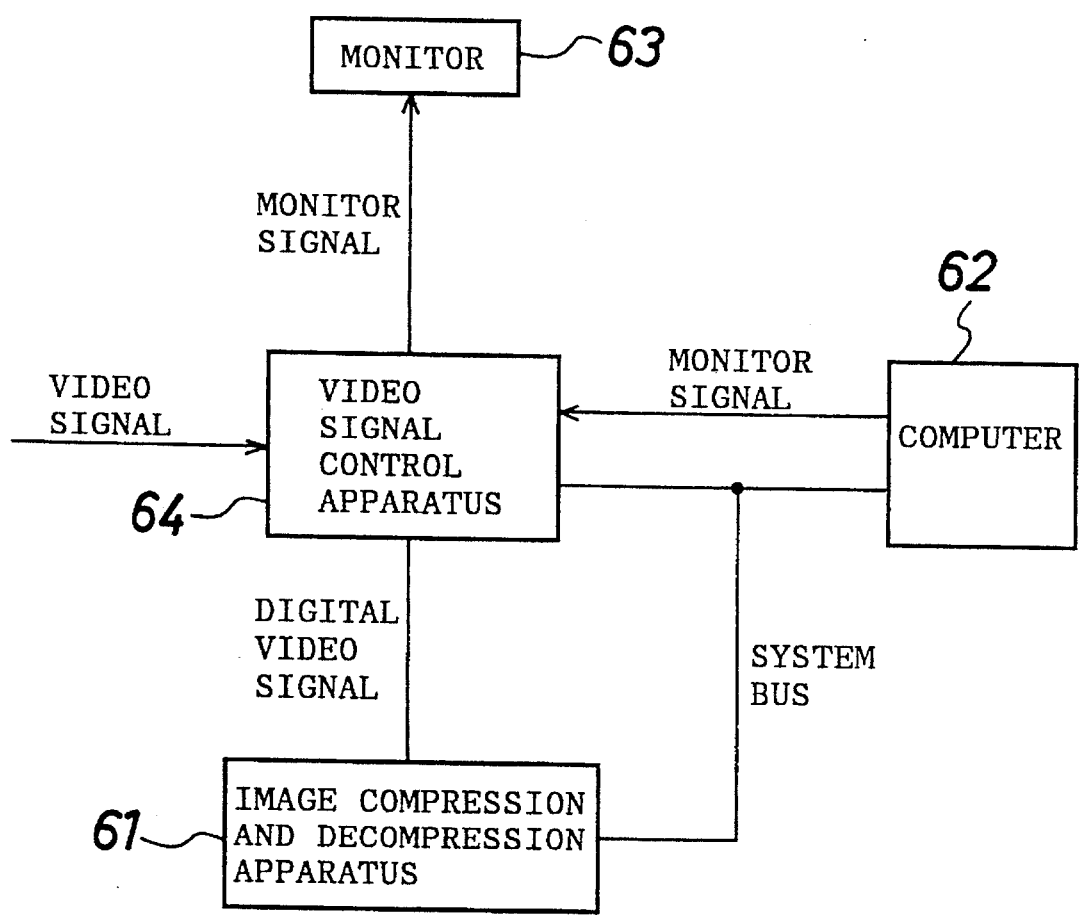
FIG. 10 is a block diagram showing a system in which an/image compression and decompression apparatus according to the present invention is incorporated.
Figure 11:
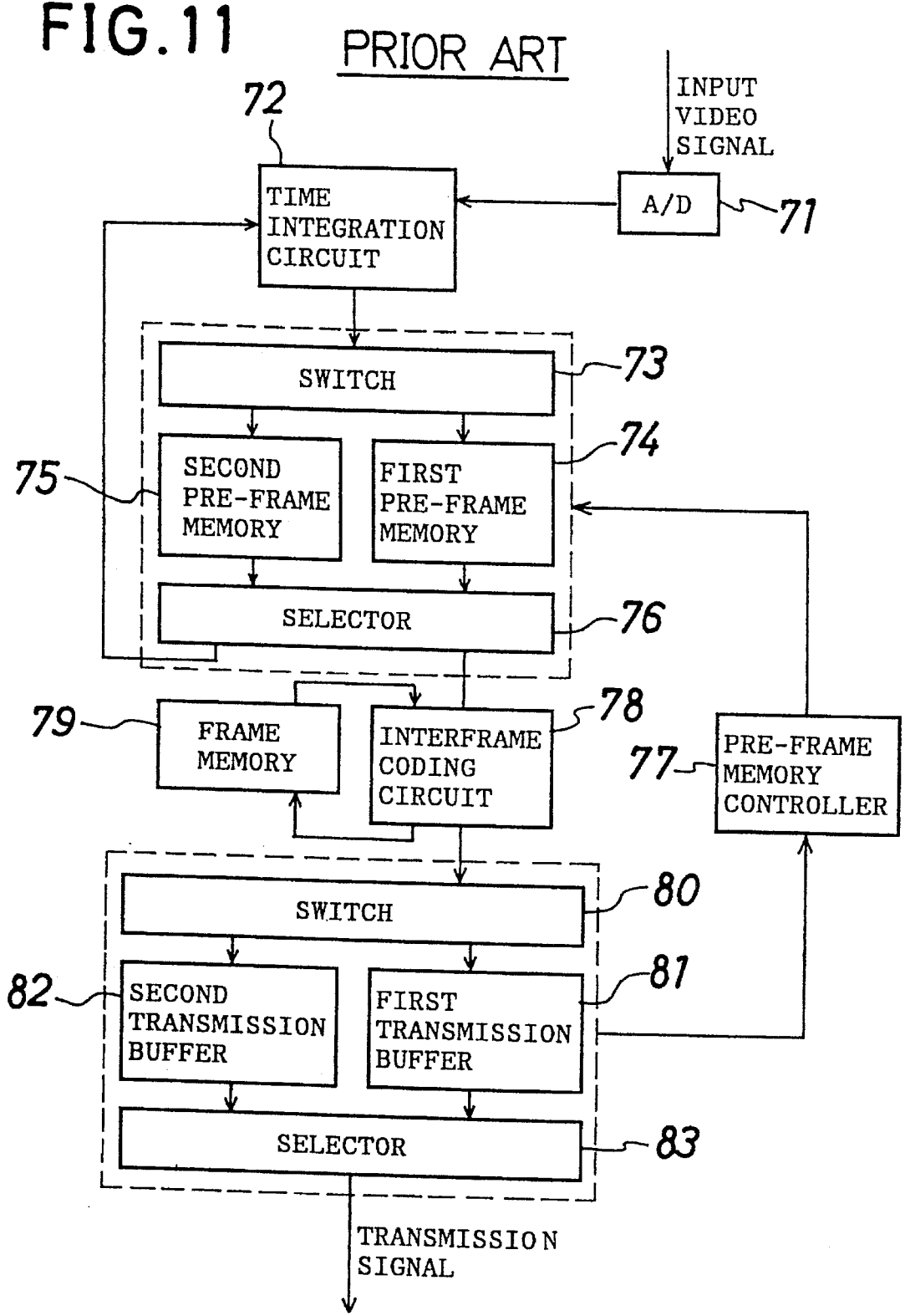
FIG. 11 is a block diagram showing a conventional image compression circuit.
Figure 12:
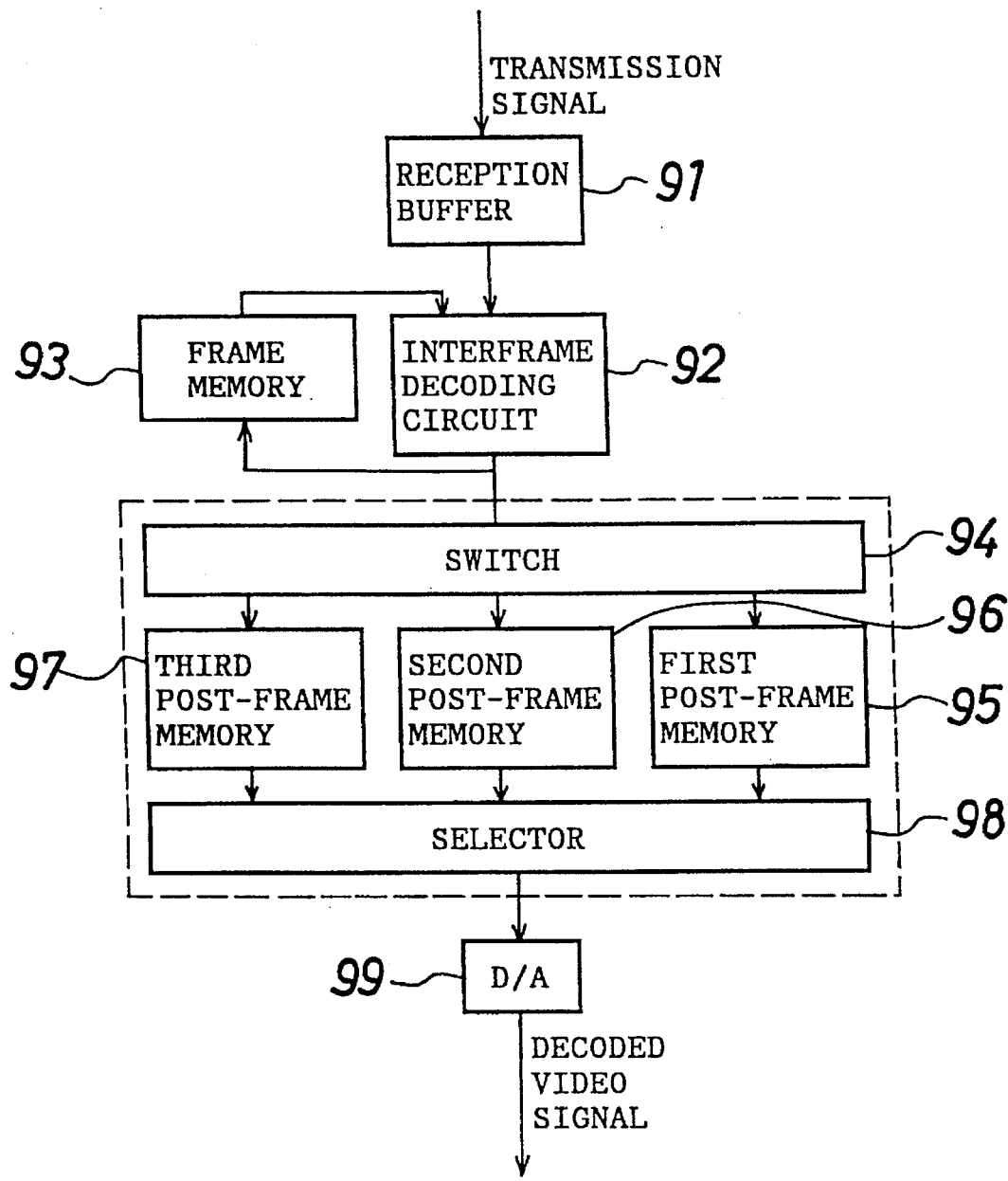
FIG. 12 is a block diagram showing a conventional image decompression circuit.

FIG. 10 shows a system in which an image compression and decompression apparatus according to the present invention is incorporated. Referring to FIG. 10, the system shown includes an image compression and decompression apparatus 61 of the present invention, a host computer 62, a monitor 63 of the host computer 62, and a video signal control apparatus 64 which operates under the control of the host computer 62. Upon compression, the video signal control apparatus 64 digitizes a video signal and transfers the digitized video signal to the image compression and decompression apparatus 61. But upon decompression, the video signal control apparatus 64 receives data from the image compression and decompression apparatus 61, overlays the received data with computer data and outputs the resulted data to the monitor 63.

Having now fully described the invention, it will be apparent to one of ordinary skill in the art that many changes and modifications can be made thereto without departing from the spirit and scope of the invention as set forth herein.

What is claimed is:

1. An image compression and decompression apparatus, comprising:

first and second frame memories, each of said first and second frame memories having a double buffer construction which includes a pair of buffers, each frame memory buffer having a storage capacity for data forming at least one frame and switchably used in units of a frame or a field, each of said frame memories serving as a pre-frame memory for storing digital image data before compression when said image compression and decompression apparatus effects compression processing, and as a post-frame memory for storing digital image data after decompression when said image compression and decompression apparatus effects decompression processing;

first and second compressed image memories, each of said first and second compressed image memories having a double buffer construction which includes a pair of buffers, each compression memory buffer having a storage capacity for data forming at least one frame and switchably used in units of a frame or a field, each of said compression memories serving as a transmission buffer for storing data after compression when said image compression and decompression apparatus effects compression processing, and as a reception buffer for storing data before decompression when said image compression and decompression apparatus effects decompression processing;

an orthogonal transformer for transforming a digital video signal by orthogonal transformation or inverse orthogonal transformation;

a video memory controller for controlling accessing to said first and second frame memories, fetching a video signal and switching between orthogonal transformation and inverse orthogonal transformation of said orthogonal transformer;

a memory controller for controlling accessing to said first and second compressed image memories and for interfacing with a host computer; and a processor for effecting control of said video memory controller and said memory controller including delivery of an instruction to perform a compression operation or a decompression operation in accordance with a program.

* * * * *